(12) United States Patent
Browning, Jr. et al.

(10) Patent No.: US 7,755,027 B2
(45) Date of Patent: Jul. 13, 2010

(54) SECURE TRANSMISSION CABLE HAVING WINDINGS CONTINUOUSLY LAID IN OPPOSITE DIRECTIONS

(75) Inventors: Thomas E. Browning, Jr., Spartanburg, SC (US); Douglas E. Piper, Sr., Greenville, SC (US); Mary H. Owens, Simpsonville, SC (US); Marko N. Veil, Greenville, SC (US)

(73) Assignee: Woven Electronics, LLC, Simpsonville, SC (US)

( * ) Notice: Subject to any disclaimer, the term of this patent is extended or adjusted under 35 U.S.C. 154(b) by 0 days.

(21) Appl. No.: 11/975,803

(22) Filed: Oct. 22, 2007

(65) Prior Publication Data

US 2008/0122617 A1    May 29, 2008

(51) Int. Cl.
*G01J 1/04* (2006.01)
*G02B 6/44* (2006.01)

(52) U.S. Cl. ............... 250/227.14; 385/104; 385/107
(58) Field of Classification Search ............ 250/227.14; 385/100–114
See application file for complete search history.

(56) References Cited

U.S. PATENT DOCUMENTS

| | | | |
|---|---|---|---|
| 4,217,488 A | 8/1980 | Hubbard | |
| 4,365,865 A * | 12/1982 | Stiles | 385/101 |
| 4,369,437 A | 1/1983 | Thompson, Jr. et al. | |
| 4,447,123 A | 5/1984 | Page et al. | |
| 4,777,476 A | 10/1988 | Dank | |
| 4,814,562 A | 3/1989 | Langston | |
| 4,829,286 A | 5/1989 | Zvi | |
| 4,859,024 A * | 8/1989 | Rahman | 385/112 |
| 5,049,855 A | 9/1991 | Slemon et al. | |
| 5,055,827 A | 10/1991 | Philipp | |
| 5,434,557 A | 7/1995 | Alizi | |
| 5,592,149 A | 1/1997 | Alizi | |
| 5,594,239 A | 1/1997 | Lessing | |
| 5,790,285 A | 8/1998 | Mock | |
| 6,002,501 A | 12/1999 | Smith et al. | |
| 6,236,789 B1 | 5/2001 | Fitz | |
| 6,559,437 B1 | 5/2003 | Pope, Jr. et al. | |
| 2004/2330954 | 11/2004 | Neff et al. | |
| 2005/0244116 A1 * | 11/2005 | Evans | 385/110 |
| 2005/0265673 A1 * | 12/2005 | Mumm et al. | 385/100 |
| 2006/0127014 A1 * | 6/2006 | Ledbetter et al. | 385/109 |

FOREIGN PATENT DOCUMENTS

GB    2098770 A    11/1982

* cited by examiner

*Primary Examiner*—Thanh X Luu
(74) *Attorney, Agent, or Firm*—McNair Law Firm; Cort Flint

(57) ABSTRACT

The invention consists of a secure data transmission cable for electronically transmitting secure data between remote locations in an exposed condition. The data transmission cable comprises a tubular outer protective layer, an inner core disposed within the outer protective layer, a data transmission line carried within the inner core for transmitting secure data between the remote locations, and a fiber optic sensor line included in the outer protective layer for detecting unauthorized activity relative to the transmission line. The fiber optic data transmission line comprises a plurality of optical fibers for transmitting data between remote locations and for detecting unauthorized activity relative to the transmission line. A protective casing surrounds the data transmission line for protecting the fiber optic data transmission line from contacting the outer protective layer. An outer protective casing braided around the core in which the sensor line is enclosed provides strength to the cable.

11 Claims, 11 Drawing Sheets

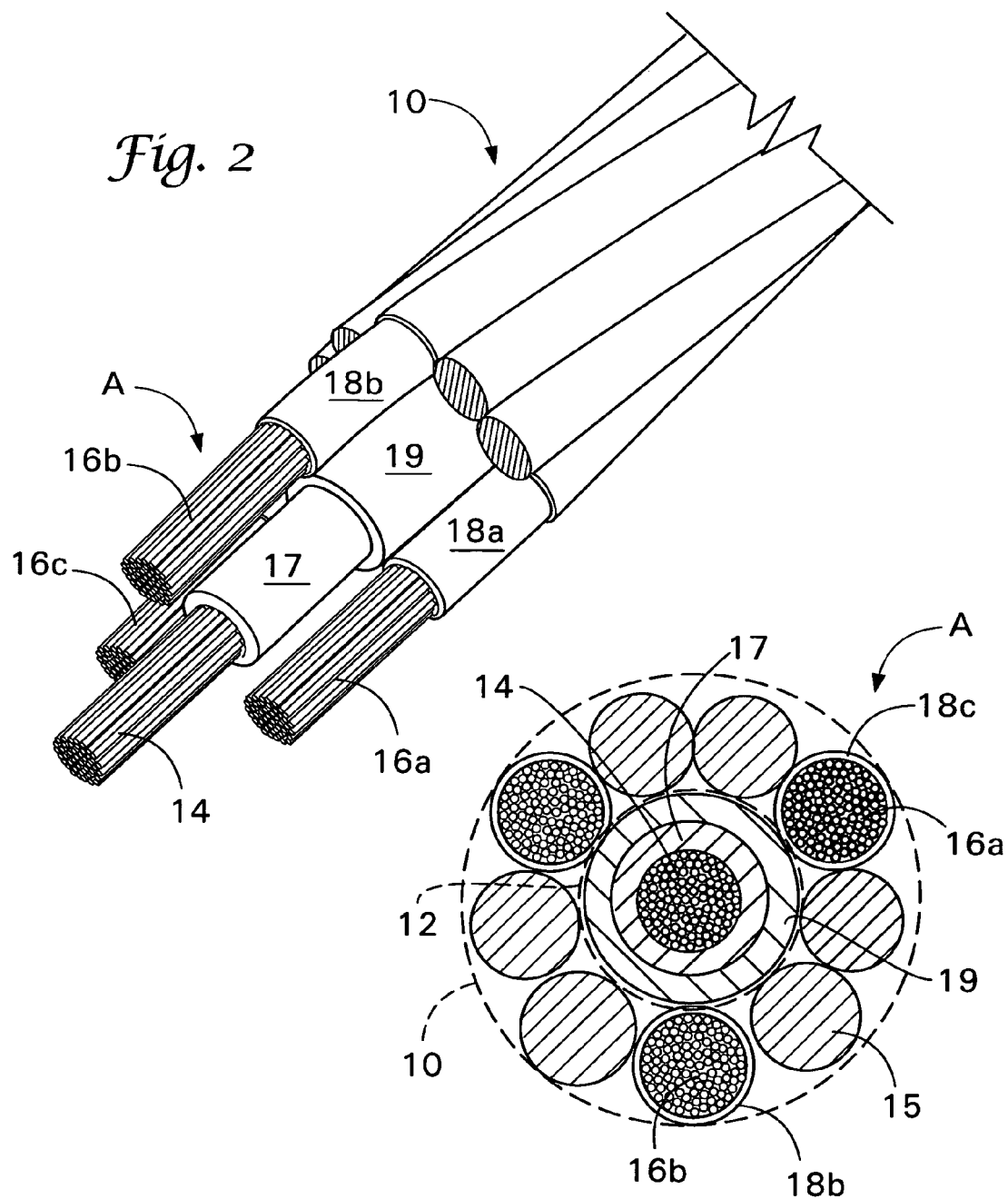

SECURE TRANSMISSION CABLE HAVING WINDINGS CONTINUOUSLY LAID IN OPPOSITE DIRECTIONS

CROSS REFERENCE TO RELATED APPLICATION

This application claims the priority and benefit of U.S. application Ser. No. 11/890,450, filed Aug. 6, 2007, entitled Double-End Fiber Optic Security System For Sensing Intrusions, PCT Application serial No. PCT/US2006/014601 filed Apr. 19, 2006 entitled Secure Transmission Cable; Provisional Application Ser. No. 60/673,699, filed on Apr. 21, 2005, entitled Secure Above Ground Fiber Optic Data Transmission Cable; PCT Application Serial No. PCT/US/2005/40080, filed Nov. 4, 2005, entitled Apparatus and Method for A Computerized Fiber Optic Security System; co-pending U.S. application Ser. No. 11/083,038, filed Mar. 17, 2005, entitled Apparatus and Method for A Computerized Fiber Optic Security System; PCT Application Serial No. PCT/US/2005/40079, filed Nov. 4, 2005, entitled Vehicle Denial Security System; U.S. Provisional Application Ser. No. 60/626,197, filed Nov. 9, 2004, entitled Vehicle Denial Security System; PCT Application Serial No. PCT/US/2004/013494, filed May 3, 2004, entitled Fiber Optic Security System for Sensing the Intrusion of Secured Locations; U.S. application Ser. No. 10/429,602, filed May 5, 2003, entitled Fiber Optic Security System for Sensing the Intrusion of Secured Locations; and U.S. Provisional Application No. 60/456,687, filed Mar. 15, 2003, entitled Fiber Optic Security System for Sensing the Intrusion of Secured Locations; all of the above applications being incorporated herein by reference in their entireties.

FIELD OF THE INVENTION

Background Of The Invention

This invention is directed to a secure, above-ground high-speed data transmission cable, and particularly to a cable having a data transmission line and additional surrounding fiber optic lines for security monitoring which may be routed above ground.

Data transmission cables are routinely used to transmit highly sensitive data from one computer to another. For example, within a military facility, multiple computers may be linked together over data transmission cables. The users of these computers transmit highly sensitive data relating to military operations and national security over these cables. There exists a need to monitor the cables so as to avoid any interception and theft of the highly sensitive data transmitted on them. For this reason, the cables used in these military facilities are often limited as to their length, as they cannot be monitored over vast lengths.

It is of particular importance to monitor any cables that are above-ground as they are easier to access than buried cables. For a variety of reasons, it is advantageous in certain situations to have data transmission cables above-ground rather than buried. These cables must be monitored to ensure that the data being transmitted over them is not being intercepted by another party. Attempts have been made to monitor fiber optic cables in the past. These attempts have been limited to determining if the cable has been damaged.

U.S. Patent Application Publication 2004/0146254 discloses the insertion of an indicator that can be visually seen when the cable has been degraded. While this allows for repair of a damaged cable, it does nothing for securing the underlying fiber optic data transmission cable and data.

Other attempts have been directed toward cables that are buried under water. These cables must be monitored for damage internally as viewing a cable buried under the ocean is extremely difficult. For example, U.S. Pat. No. 4,623,218 discloses the use of electrical leads within the cables that complete a circuit to send a signal indicating that the electrical leads have not been damaged. Once the electrical leads that surround the fiber optic data transmission cable are damaged, the circuit that they complete is broken, and this indicates to an observer that damage has occurred to the cable. This allows cables that have already been damaged to be repaired.

Accordingly, an object of the present invention is to provide a secure high-speed data transmission cable protected against compromising of the cable and accessing of the transmitted data.

SUMMARY OF THE INVENTION

The above objectives are accomplished by providing a secure data transmission cable for electronically transmitting secure data between remote locations in an exposed condition. The data transmission cable comprises a tubular outer protective layer and an inner core disposed within the outer protective layer. A data transmission line is carried within the inner core for transmitting secure data between the remote locations. A fiber optic sensor line is included in the outer protective layer for detecting unauthorized activity relative to the transmission line.

The fiber optic data transmission line may comprise a plurality of optical fibers for transmitting data between remote locations. A protective casing surrounds the data transmission line for protecting the fiber optic data transmission line from contacting the outer protective layer. The casing includes an inner and an outer casing which move relative to each other to provide flexibility to the inner core. The sensor line may be carried within a hollow tubular strand in the outer protective layer which includes a plurality of reinforcing strands formed with the tubular strand to provide flexibility to the inner core. The tubular strands, which contain sensor lines, and the reinforcing strands may be metallic. A plurality of the tubular strands may be braided in the outer tubular braid wherein each of the tubular strands contains a fiber optic sensor line for detecting unauthorized activity relative to the transmission line.

The objectives are further accomplished by a secure data transmission system for securely transmitting data among remote computers connected by above-ground cables. A data transmission cable is provided for connecting first and second computers. The data transmission cable includes a data transmission line for transmitting data and a fiber optic sensor line for detecting unauthorized activity relative to the cable. A scanning unit is in communication with the fiber optic sensor line for continuously pulsing the sensor line to determine the status of the sensor line. A security computer is provided in communication with the scanning device for determining an initial baseline signal based on the initial pulse. The security computer then compares the baseline signal with a status signal determined based on a later pulse of the sensor line. A fault signal is generated in response to a predetermined charge in the status signal. An audible alarm is included for receiving the fault signal and audibly indicating the occurrence of unauthorized activity is connected to the data transmission cable. The scanning unit may comprise an optical time domain reflectometer (OTDR) for continuously pulsing the sensor line to determine the status of the sensor line.

The objectives are further accomplished by a computerized method for the high-speed, secure transmission of data along an accessible transmission line comprises transmitting data along a data transmission line. A protective layer of the cable is provided which surrounds the data transmission line having a fiber optic sensor line extending longitudinally through the protective layer. The sensor line is scanned to determine the status of the line. If a change in a signal transmitted along the sensor line in response to a prescribed attempt to compromise the transmission line is detected, an alarm signal is generated and transmitted to an associated alarm. The alarm is then actuated in response to the attempt to compromise the transmission line.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 2 is a cutaway perspective view illustrating a fiber optic data transmission cable having a data transmission fiber optic line and a plurality of fiber optic security lines according to the invention;

FIG. 3 is a sectional view taken along line 3-3 of FIG. 2 illustrating a fiber optic data transmission cable according to the invention;

DESCRIPTION OF A PREFERRED EMBODIMENT

Figure 1:
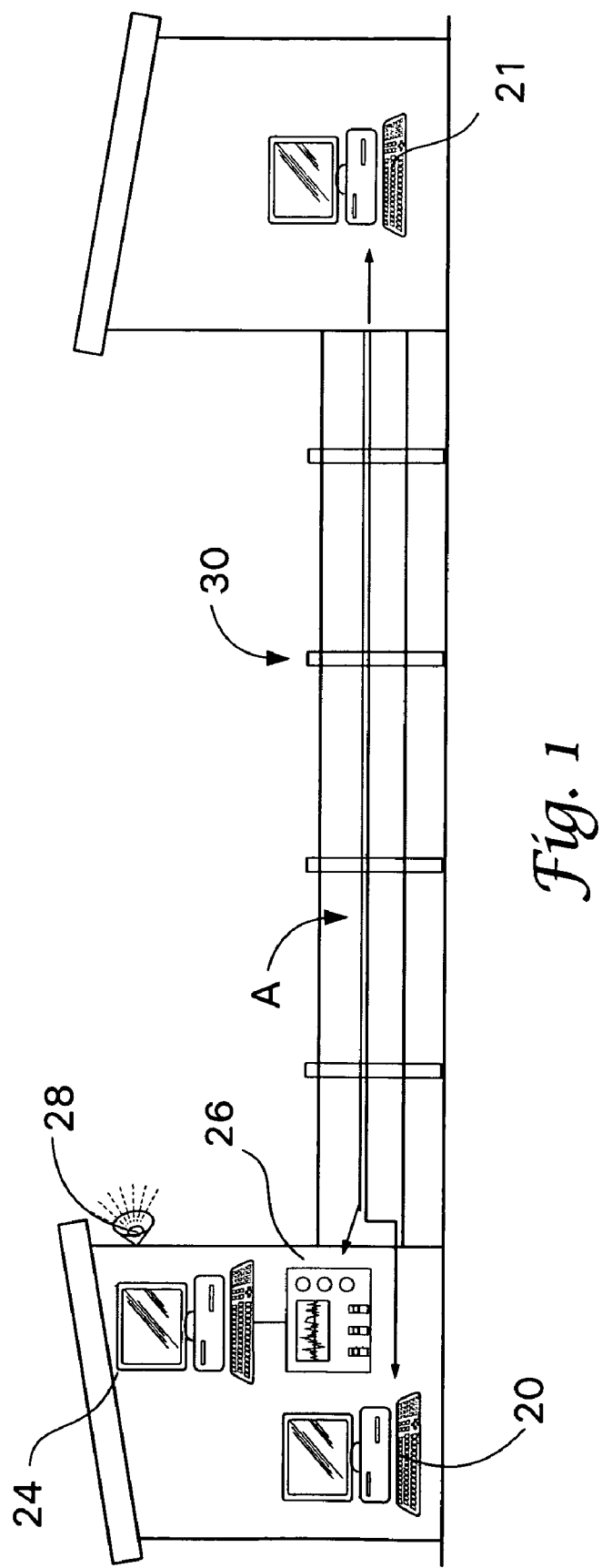
FIG. 1 is a schematic illustration of an embodiment of a secure fiber optic data transmission cable constructed according to the invention for connecting multiple computers and for detecting unauthorized activity relative to the cable.

Referring now to the drawings, an illustrative embodiment of the invention will be described in more detail.

FIG. 1 illustrates the invention in operation. Secure data transmission cable A connects computers 20 and 21, between which data is being transmitted. Computers 20 and 21 are housed in different buildings. These buildings are an environment where the burying of data transmission cables is not possible. Thus, fiber optic data transmission cable A is disposed above the ground along fence line 30 connecting computers 20 and 21. As the cable is disposed above-ground, it is advantageous for it to have the structure as described above for providing secured data transmission between computers 20 and 21. The cable contains a data transmission line that allows for data to be transmitted between the computers 20 and 21. The cable A also contains a fiber optic sensor line which is connected to a fiber optic scanning unit 26. The fiber optic scanning unit in a preferred embodiment is an OTDR (optical time domain reflectometer). The scanning unit 26 is connected to a computerized user interface system B which processes reflected signals received by the scanning unit to determine a fault signal, and its nature and location. The user interface system provides intelligence information in a user friendly format. The user interface system includes a security computer 24 with an audible alarm 28. Upon the detection of unauthorized activity on data transmission cable A, alarm 28 will be actuated. The user interface system will be more fully described hereinafter.

As can best be seen in FIGS. 2 and 3, a secure data transmission cable, designated generally as A, is illustrated having an outer tubular protective layer 10, and an inner core 12. A fiber optic data transmission line 14 is carried in the inner core extending along the length of the cable for transmitting secured data between remote locations. Data transmission line 14 allows for the transmission of data amongst multiple computers, phones, fax machines, and other data transmission devices. A fiber optic sensor lines 16a, b, c extend throughout the length of protective layer 10 for protecting the transmission line.

Data transmission line 14 includes a bundle of optical fibers for providing high-speed data transmission. Fiber optic data transmission line 14 is enclosed in an inner casing 17 and an outer casing 19 to protect the bundle of fibers from exposure that could compromise the data being transmitted. Protective casing includes inner casing 17 and outer casing 19 which are used to reinforce the strength of the inner core while allowing for bending of the cable without a loss of strength.

Preferably, there are three sensor lines, fiber optic sensor lines 16a, 16b and 16c, included in outer protective layer 10. The security lines may be braided around data transmission line 14 along with braided wires 15 to continuously protect fiber optic data transmission line 12 from unauthorized access along the length of the cable. The fiber optic sensor lines are adapted to carry signals that are used to determine the status of the sensor line. Note that in alternative embodiments, a single fiber optic sensor line may be used to protect a fiber optic data transmission line. In further embodiments, any number of fiber optic sensor lines may be included to protect data transmission line 14. The fiber optic sensor lines are enclosed in single cable jackets 18a, 18b, and 18c, respectively, to ensure exact measurements of the status of the sensor lines.

The detailed description that follows may be presented in terms of steps of methods or in program procedures executed on a computer or network of computers. These procedural descriptions are representations used by those skilled in the art to most effectively convey the substance of their work to others skilled in the art. These steps require physical manipulations of physical quantities such as electrical or optical signals capable of being stored, transferred, combined, compared, or otherwise manipulated. A computer readable medium can be included that is designed to perform a specific task or tasks. Actual computer or executable code or computer readable code may not be contained within one file or one storage medium but may span several computers or storage mediums.

These computer readable instructions may be loaded onto a general purpose computer, special purpose computer, or other programmable data processing apparatus to produce a machine such that the instructions will execute on a computer or other data processing apparatus to create a means for implementing the functions specified herein.

Scan unit 26 is in communication with security computer system 24. Fault signals are generated to the security computer when a fault condition arises. As used herein, "fault condition" means a condition in which sensor line 16b has been cut, or damaged in a manner indicating a person has attempted to compromise the cable and tap into the secure data. Scan unit 26 continuously pulses sensor line 16b, in accordance with scanning instructions processed by computer 24. For example, the computer may control the scan unit to pulse the security line every four seconds.

The scan signals 27 are reflected back, and security computer 24 is programmed to compare the reflected scan signals 29 to the baseline signal to determine whether a predetermined signal (attenuation) deviation representing a fault condition has occurred. In the event the fault condition is detected, a fault signal is generated by the computer along with a calculation of the nature and type of the fault and the location of the fault condition. A set of level data can be included in communication with security computer 24. The set of level data may be in the form of a look-up table containing attenuation levels and reflective spikes and corresponding fault information, i.e., break or damage event.

When security computer 24 begins operation, a baseline signal must be established. The baseline signal represents the status of the fiber optic cable being monitored at a normal or undisturbed state. Initially, computer 24 processes baseline initialization instructions, which signal scanning unit 26 to pulse security line 16b. The pulse creates a significant rise in signal level, referred to as a reflective launch spike, preceded by some noise. The normal signal levels start the beginning of the baseline signal. The security computer continues to establish the baseline until a drop to the noise floor occurs indicating the end of the sensor line being scanned. After the drop, further noise occurs. The security computer will then remove a small portion at the beginning of the baseline and a small portion at the end that are merely reflections of the noise launch, and drop. The final baseline signal is then stored for comparison to future attenuations in the sensor line to determine if a fault has occurred.

Figure 4:
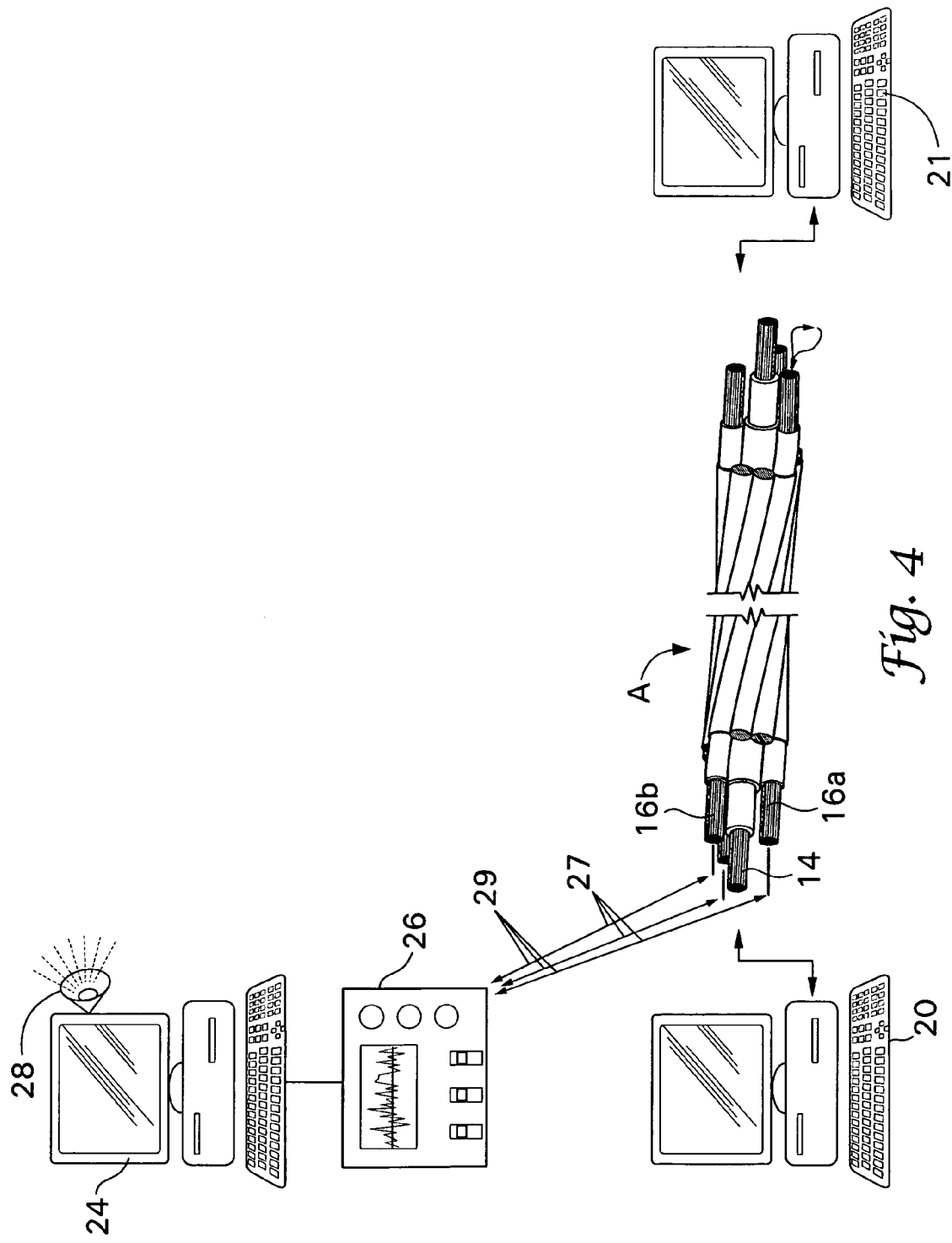
FIG. 4 is a schematic view illustrating a fiber optic data transmission cable included in a computerized intrusion detection system according to the invention connecting multiple computers.

During the operation, security computer 24 controls scanning unit 26 to continuously pulse sensor line 16b and receive back scan signals representing real-time scans. With each incoming scan signal, the security computer checks to see if any abnormal attenuations are detected. If a significant attenuation change is detected, its location is compared to the baseline signal previously acquired. If the attenuation matches a pre-existing attenuation from the baseline, then the security computer will not report a fault. Any sensor line being pulsed will have some bends and attenuations in its baseline signal. A straight cable extending perfectly vertically from scanning unit 26 will be one of the few instances that no attenuations will be found in the baseline. Thus, every attenuation detected by the computer system will not indicate a fault and may simply indicate a pre-existing bend. Further, some attenuations will be slight, indicating a slight movement of the cable that does not indicate a fault. The attenuations that most concern a user of this system will be those that show a breach or significant damage to the sensor line, and hence a fault condition. In this case, an alarm would be actuated. FIGS. 3 and 4 illustrate the alarm as being a speaker for audibly indicating the occurrence of unauthorized activity on fiber optic cable A. Note that in alternative embodiments, visual or other alarms may be used to indicate unauthorized activity. The location of the attenuation on the signal will correspond to a location on the sensor line where a breach may have occurred. Thus, the security computer 24 would be able to display the location of the breach on an associated map by associating the attenuation in the signal with a breach in the barricade cable.

Figure 5:
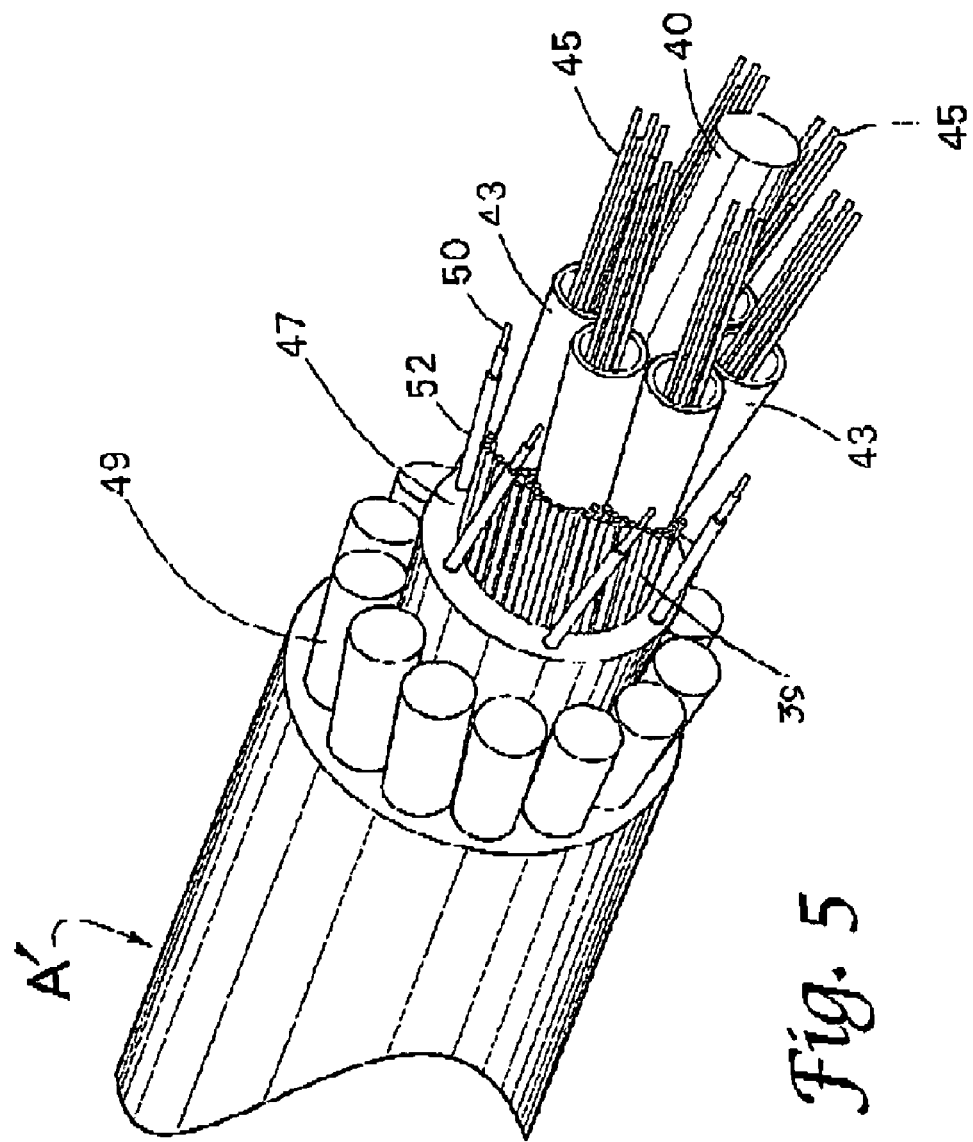
FIG. 5 is a perspective view of an alternate embodiment of a secure transmission cable according to the invention with parts cut away.
Figure 6:
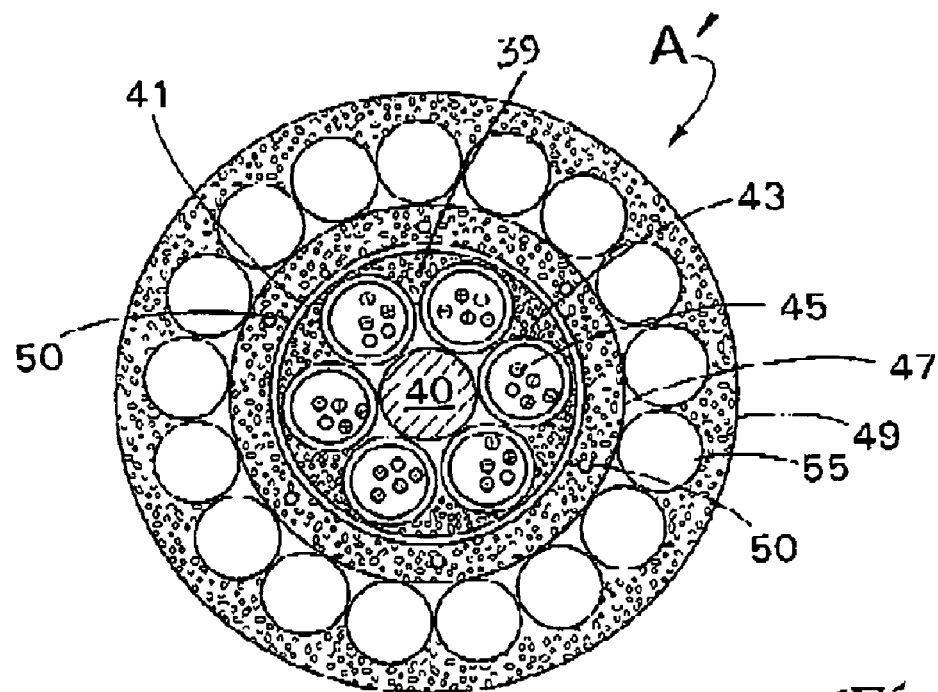
FIG. 6 is a sectional view taken along line 6-6 of FIG. 5.
Figure 7:
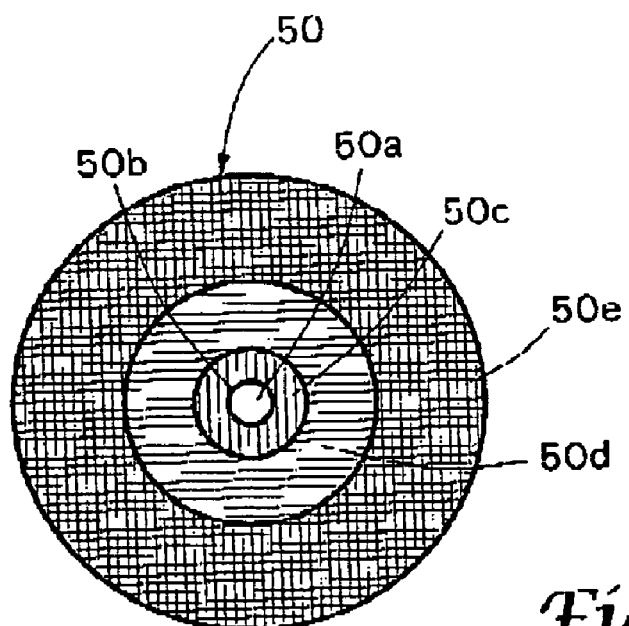
FIG. 7 is a sectional view of an optical sensor fiber according to the invention.
Figure 8:
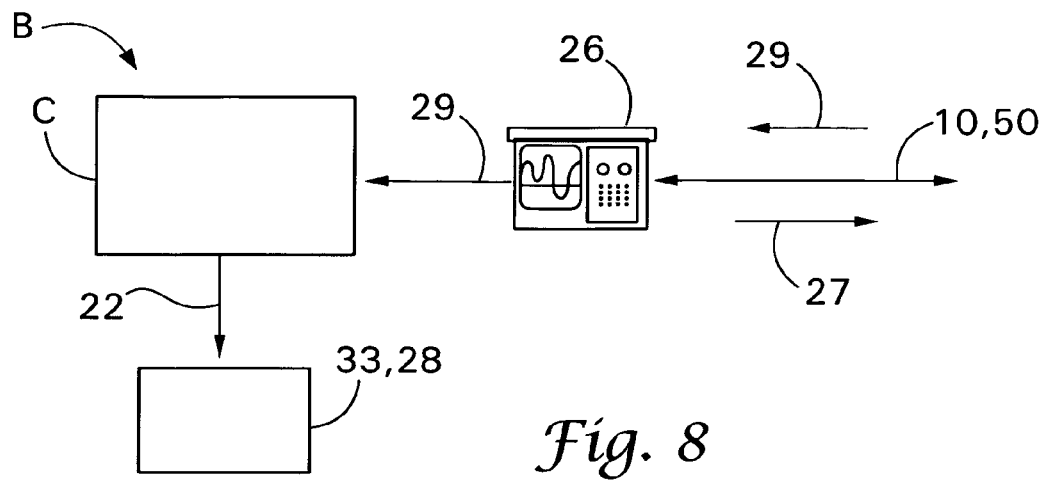
FIG. 8 is a block diagram illustrating an optical sensor scanning unit and computerized interface system according to the invention.
Figure 9:
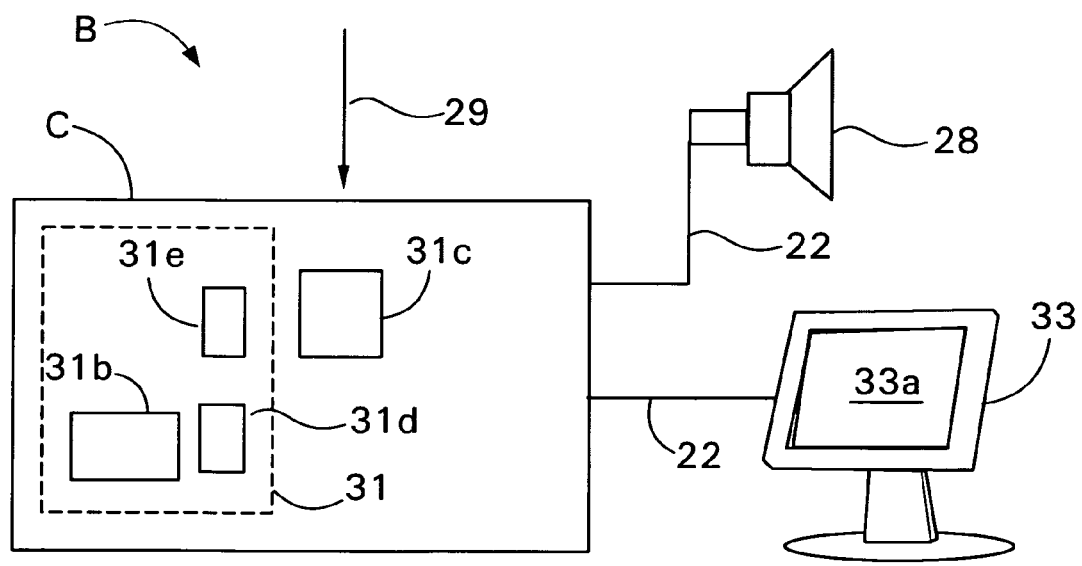
FIG. 9 is a detailed block diagram illustrating an optical sensor scanning unit and computerized interface system according to the invention.

As can best be seen in FIGS. 5, 6, and 7, another embodiment of a secure data transmission cable, designated generally as A', is illustrated in accordance with the invention. At the center of the cable is a fiberglass rod (40). The rod provides some stiffness to the cable to prevent excessive bending that may damage the optical fibers within (both communication and sensor fibers). The central rod also serves to prevent excessive contraction of the cable in cold temperatures since the material of the central rod has a coefficient of thermal expansion closer to that of optical fiber than the other plastic components in the cable. This same feature also helps protect the sensor fibers from excessive cable contraction.

Surrounding the central rod are buffer tubes 43. The number of buffer tubes is dependent on the number of fibers In the cable. Each buffer tube can accommodate up to twelve communications fibers 45. However, there is a minimum of five buffer tube positions to keep the cable round and eliminate a preferential bending direction. If fewer than five buffer tubes are required to house communications fibers 45, then the positions are filled with solid plastic filler rods 39. These rods only serve to take up space that would otherwise be used for buffer tubes and are trimmed away at splice and termination points. The buffer tubes are gel filled. The purpose of the gel is to act as a lubricant to protect the fibers when the cable is in a dynamic state (installation and aerial, windy conditions, for example), and to block water from traveling through the buffer tube should the cable jacket and tube be breached.

The buffer tubes are installed over the central member in a continuous helical pattern. This is in contradiction to standard optical cables used in television and communication cabling that use a reverse-oscillation lay. In the reverse-oscillation lay the helix windings are wound in alternating first and second directions creating a slack space between the windings for splicing, etc. The windings of a continuous helix are all wound in the same direction which is advantageous for the security applications being made according to the invention, and will be described in more detail later. The helical pattern of the buffer tubes, continuous or not, in any fiber optic cable is for mechanical isolation of the fibers from the cable. During installation and operation, the cable may experience tensile loads and thermal contraction that will cause the plastic components of the cable to elongate or shrink more than the glass fibers. The optical performance of the communications fibers is preserved by the fact that the fibers are isolated from these slight changes in the cable length. The communications fibers in the buffer tubes can be of any type that the end user may desire. Common fiber types that are to be used are single-mode, 50 micron multimode, and 62.5 micron multimode, but, again, special and mixed fiber types can be included in the cable.

The buffer tubes are held in place during manufacturing with binder threads 41 that wind in opposite directions over buffer tubes 43. In addition to holding the tubes in place during manufacturing, the binder threads are impregnated with a water-absorbing material. If the cable jacket is breached and water enters the cable, then these binder threads will expand and block the passage of water through the interstitial spaces in the cable. Water in a fiber cable can wreak havoc if the cable is subjected to freezing temperatures since the water will expand and crush cable components and destroy the fragile optical fibers.

An inner cable jacket 47 is the next layer illustrated in the form of a thin polyethylene layer applied over the buffer tubes and binder threads. This inner layer is what an outer cable jacket 49 will adhere to in order to lock the nerve fibers in place. After the inner jacket layer 47 is applied, sensor fibers 50 are placed onto the cable. As can best be seen in FIG. 7, sensor cables 50 preferably include core optic fiber 50a, a fiber cladding 50b, an acrylate fiber coating 50c, a pvc fiber coating 50d, and an outer fiber glass coating 50e. Having sensor fibers in the jacket is a main feature of what makes this product very unique. There are six (typically) sensor fibers installed into the cable. They are installed in a continuous helical pattern that winds opposite to the wind direction of the buffer tubes. The helical pattern allows for bending of the cable without excessive tensile or compressive forces on the sensor fibers. This is also a security feature described later.

The fibers are preferably of the single mode type. Single mode fiber provides the performance necessary over long distances, which makes this product optimal for long cable installations where other types of security are impossible or impractical. The sensor fiber coating is of a special construction that provides for the mechanical protection needed for a fiber placed inside of the cable jacket. Since there is no mechanical isolation for the sensor fibers as seen with the communications fibers, the fibers need to be reinforced, and this is accomplished by using a fiberglass coating 52.

The final layer in the cable is outer polyethylene jacket 48 over the top of the sensor fibers. This final jacket will adhere to jacket 46 and create a solid jacket with sensor fibers permanently embedded within. Layer 48 completes the illustrated cable design. An option is the addition of metallic armor in the form of aluminum clad steel wires 55 applied in a continuous helix over jacket 47 of the cable. Metallic armor provides mechanical protection from crush and ballistics. allows placement of the cable directly in the ground, on top of the ground, or sub-sea. This armor is significantly different than that found in standard optical cable. Standard optical cable uses a corrugated steel tape that's laminated on both sides for corrosion protection. Standard armor can be (and is designed to be) opened with everyday cable access tools. Outer polyethylene jacket 48 is applied over the wires to complete the armored version. This final jacket provides corrosion protection for the metallic wires.

Security is accomplished by optically monitoring all the sensor fibers embedded in the cable jacket that surround inner communications fibers 45. Monitoring is done with OTDR 26, as explained above in regard to cable A, or other device that will discern disturbances in the fiber path, and computer user interface system B connected to the OTDR. Gaining access to communications fibers 45 in order to tap them requires getting past sensor fibers 50 without disturbing them to the point that the monitoring equipment will detect a fault condition. In addition, in order to place a tap on any of the communications fibers, a length of the fiber long enough to insert into the tap device must be exposed. This will require a displacement of one or more of the sensor fibers, and it is this process that will trigger a fault and an alarm.

The security features of this cable are centered on making displacement the necessary length of sensor fibers impossible without triggering an alarm. The sensor fibers are closely spaced and embedded in and adhered to the polyethylene jacket. The jacket material maintains continuous spacing of the sensor fibers which prevents spreading them apart. The sensor fibers are wrapped in the opposite direction as the buffer tubes. Unwinding the helically stranded buffer tubes to obtain a length of fiber is impossible since the same action would tighten the wind of the sensor fibers. The fiberglass coating on the sensor fibers provides tensile and compression strength necessary for the sensor fibers to remain intact in the cable jacket during normal operation, but cause the fibers to more easily kink if exposed. The buffer tubes are adhered to the fiberglass central member. This makes unwinding the tubes for the necessary slack more difficult without disturbing the sensor fibers.

The cable is designed to meet requirements of TEMPEST which deals with compromising emanations (CE). Compromising emanations are defined as unintentional intelligence-bearing signals which, if intercepted and analyzed, disclose the information transmitted, received, handled, or otherwise processed by any information-processing equipment. Cables can carry unintended signals via metallic components such as conductors or metallic armoring. The cable, without the optional armor, is a dielectric cable, meaning that it contains no metallic components. For this reason, it is impossible for the cable to carry signals outside of the communications fibers. TEMPEST also deals with the possibility of optical signals leaking intentionally or unintentionally from the communications fibers. This is impossible since, according to the invention, the fibers are enclosed in opaque materials. Removal of the opaque materials will trigger an alarm.

Referring to FIGS. 8 through 13, computerized user interface system B will be described in more detail. The system is described with reference to flowchart illustrations of methods, apparatus ("systems"), or computer program products according to the invention. It will be understood that each block of a flowchart illustration may be implemented by a set of computer readable instructions or code. These computer readable instructions may be loaded onto a general purpose computer, special purpose computer, or other programmable data processing apparatus to produce a machine such that the instructions will execute on a computer or other data processing apparatus to create a means for implementing the functions specified in the flowchart block or blocks. Accordingly, elements of the flowcharts shown in FIGS. 10A through 10C support combinations of means for performing the special functions, combination of steps for performing the specified functions and program instruction means for performing the specified functions.

As can best be seen in FIGS. 8 through 13, computerized user interface system B is illustrated for monitoring reflected signals 29 received from scanning unit 26 in order to detect a fault condition. Fiber optic scanning unit 26 continuously pulses the optical sensor lines 16, 50 and receives back scan signals 29 in real time estimating attenuations in the optical sensor line. Computerized user interface system B includes a system computer C, 24 which receives and processes the scan signals, and a display monitor 30. A computer readable medium 31 is in communication with the computer, and a computer program 31 b includes computer readable instructions in communication with computer readable medium 31. The medium containing the computer readable instructions may reside in computer C or be accessible by the computer elsewhere. Referring to FIG. 10A, basic instructions include receiving instructions D for receiving scan signals 29 from scanning unit 26, baseline initialization instructions E for establishing a baseline signal 51 (FIG. 11) based on initial information from the scan signals, monitoring instructions F for monitoring the optical sensor line by automatically receiving the scan signals in real-time representing the condition of the sensor line in real-time, comparison instructions G for comparing said baseline signal and said scan signs in real-time, and fault instructions H for generating a fault signal 22 in response to a predetermined change in one or more scan signals indicating a fault condition and an unauthorized activity has taken place. Output instructions 1 process fault signal 22 and include audible output instructions 11, mapping instructions 12, fault level instructions 13, location instructions 14, and display instructions 15 for providing audible and/or visual notification of a fault, according to the processing of fault signal 22 by the output instructions. A processor 31 c processes the instructions on the computer to generate a fault signal if unauthorized activity is detected. The computer transmits the fault signal to alarm device 28 and/or a graphic user interface 33a on monitor 33 to notify an attendant audibly and/or visually that the unauthorized activity has taken place.

While only a single sensor line 10, 50 is shown connected to a scanning unit schematically, it is to be understood, of course, that the sensor lines may be terminated at one or more scanning units. Preferably, the scanning unit(s) may be provided by an optical time domain reflectometer (OTDR) of the type routinely utilized to monitor maintenance of fiber optic communication systems. The user interface system B may be connected directly to the scanning unit(s) or through an internet or intranet network 27.

Scan unit 26 continuously pulses the optical sensor line 10, 50 in accordance with scanning instructions processed by computer C. For example, the computer may control the scan unit to pulse the sensor line every four seconds. Scan signals 27 are reflected back, and computer C is programmed to compare reflected scan signals 29 to the baseline signal 50 (FIG. 11) to determine whether a predetermined signal deviation (attenuation level or spike rellection) representing a fault condition has occurred. In the event the fault condition is detected, fault signal 22 is generated by the computer along with a calculation of the type of fault and location of the fault condition. A set of computer readable level data 31 d reside in communication with computer C. The set of level data may be in the form of a look-up table containing damage attenuation levels, spike reflective breaks, and corresponding fault location mapping information. This information is transmitted to the user/attendant, providing needed information to security personnel. For example, graphic interface 33a may include a map of the cable routing depicting the location of the break or damage condition on the map.

Figure 10A:
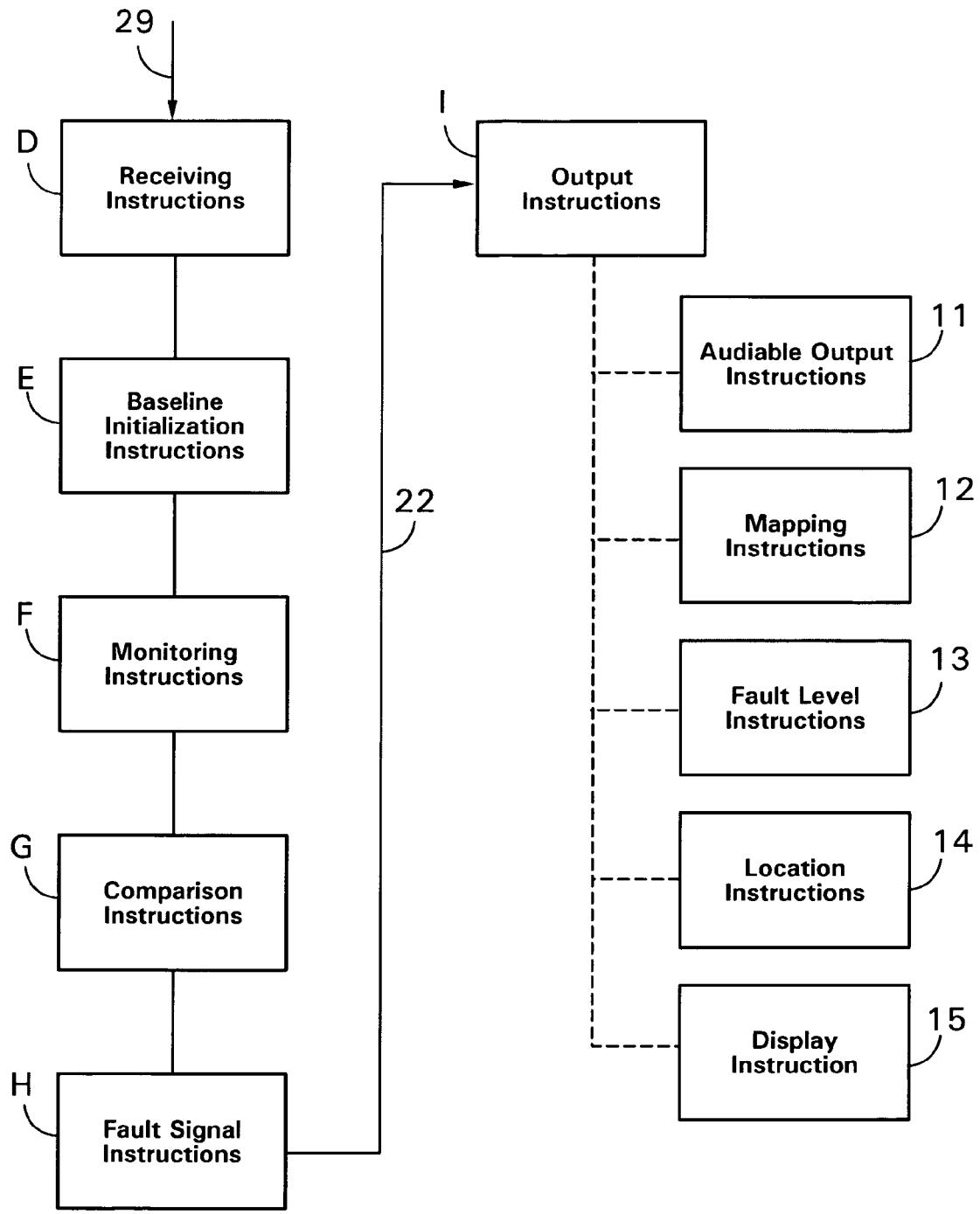
FIG. 10A is a block diagram illustrating computer readable instructions for detecting a fault condition in a fiber optical security system according to the invention.
Figure 11:
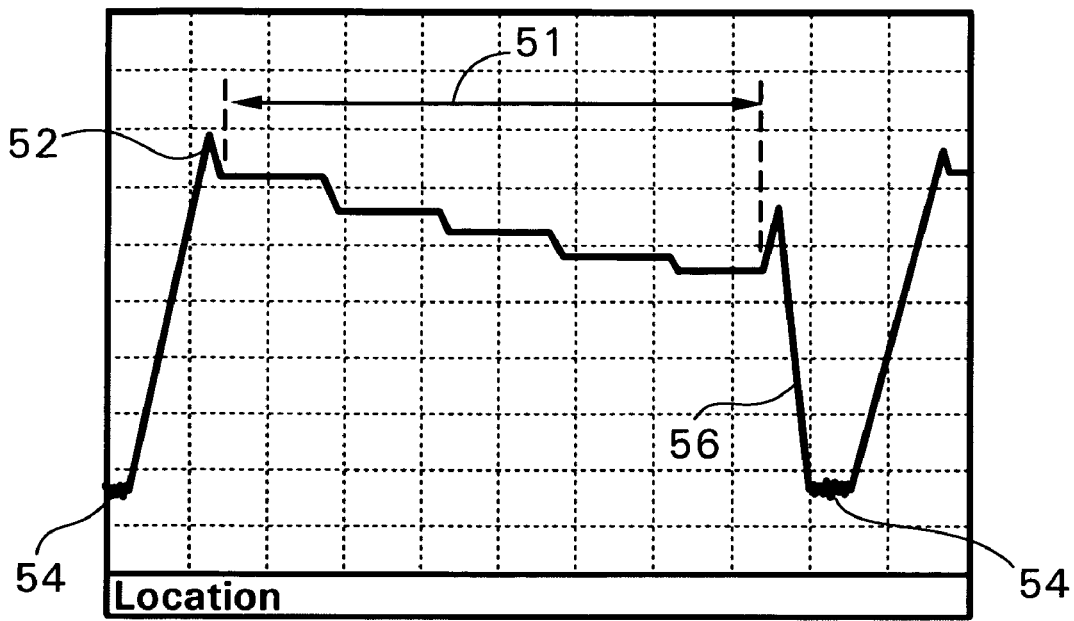
FIG. 11 is an illustration of a baseline signal used by the system.

When interface system B begins operation, baseline signal 50 must be established. The baseline signal represents the status of the fiber optic cable being monitored at a normal or undisturbed state. Initially, computer C, processing baseline initialization instructions E as shown in FIG. 10A, signals scanning unit 26 to pulse sensor line 10, 50. The pulse creates a significant rise in signal level at 52, referred to as a reflective launch spike, preceded by some noise at 54 (FIG. 11). The normal signal levels start the beginning of the baseline signal. The system continues to establish the baseline until a drop to the noise floor 56 occurs indicating the end of the sensor line being scanned. After the drop, further noise occurs. The computer system will then remove a small portion at the beginning of the baseline and a small portion at the end that are merely reflections of the noise launch, and drop. The final baseline signal 51 is then stored, for example, in computer readable memory 31, for comparison to future attenuations in the sensor line to determine if a fault has occurred.

During the operation, the computer system controls scanning unit 26 to continuously pulse optical sensor lines 10, 50 and receive back scan signals 29 representing real-time scans. With each incoming scan signal, the computer system checks to see if any abnormal attenuations are detected. If a fault attenuation is detected, its location is compared to the baseline signal previously acquired. If the attenuation matches a pre-existing attenuation from the baseline, then the computer system will not report a fault. Any sensor line being pulsed will have some bends and attenuations in its baseline signal. A straight cable extending perfectly vertically from scanning unit 26 will be one of the few instances that no attenuations will be found in the baseline. Thus, every attenuation detected by the computer system will not indicate a fault and may simply indicate a pre-existing bend or damage. Further, some attenuations will be slight, indicating a slight movement of the cable that does not indicate a fault. The attenuations that most concern a user of this system will be those that show a breach or significant damage to the sensor line, and hence a fault condition. As can best be seen in FIG. 12, an attenuation representing a significant fault at 58 is shown. This attenuation matches a complete break in cable A, A', and the computer has been programmed to recognize the attenuation as just that via level data described above. As can best be seen in FIG. 13, an attenuation matching a significant damage 40b in cable A, A' is shown. The location or distance out of the attenuation on the signal will correspond to a location on the sensor line where a fault may have occurred. Thus, the computer system would be able to display the location of the fault on an associated map by associating the attenuation in the signal with a fault in the secure cable. Further, a set of distance data 31e is provided in a look-up table format. Prescribed locations are included in table with an associated distance. The system compares the distance of the attenuation with the distances in the distance data. The distance of the attenuation may be referenced to a prescribed location, and the prescribed location is transmitted to an attendant.

Figure 10B:
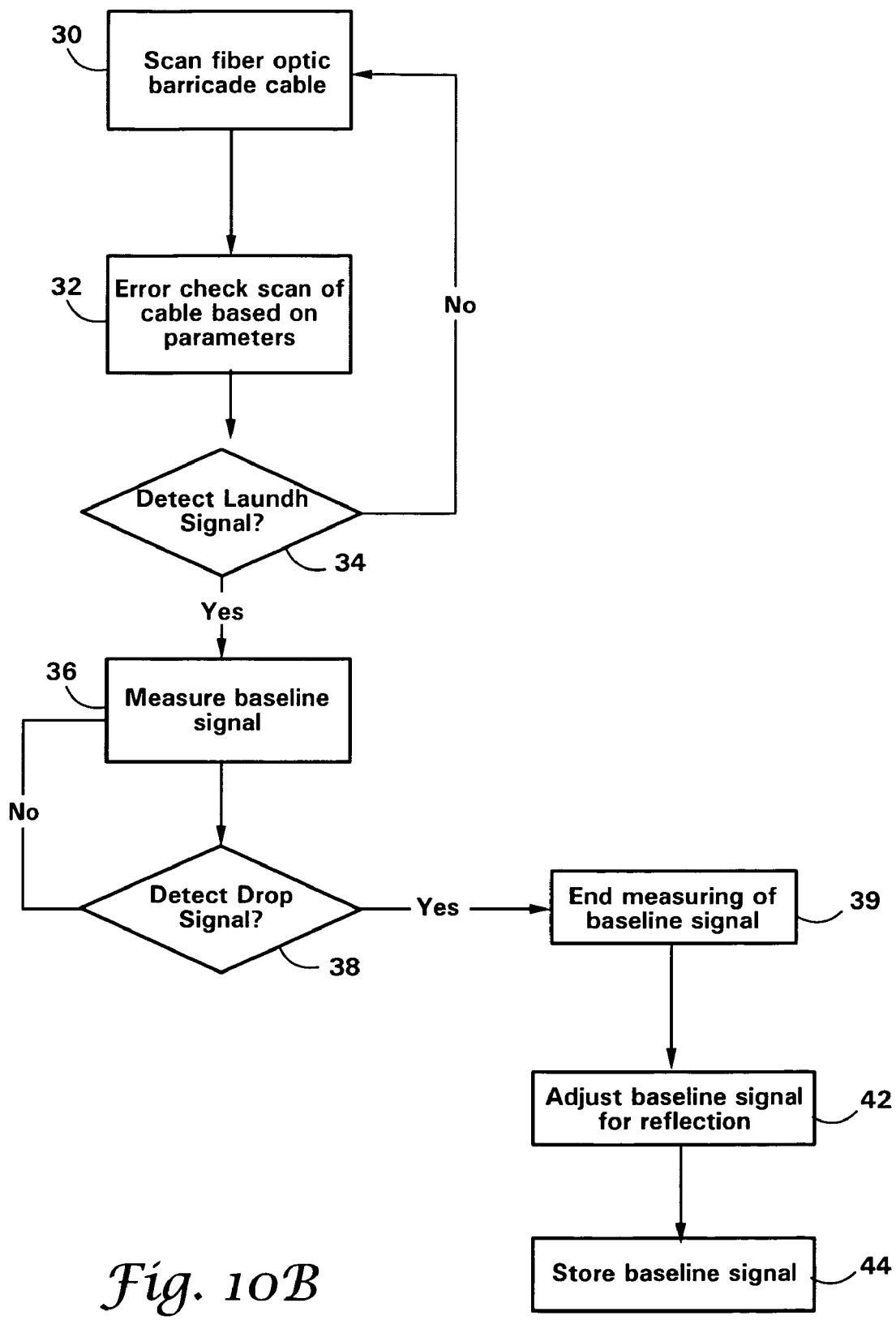
FIG. 10B is a flowchart illustrating baseline initialization instructions of FIG. 10A.

FIG. 10B illustrates the baseline initialization instructions E for initializing the computerized system to establish baseline signal 51 associated with optical sensor lines 10, 50 during an undisturbed condition, as shown in FIG. 11. At step 30, the system pulses the scanning unit to begin the scan of the sensor line. At step 32, the system error checks the scan of the line based on predetermined parameters. If valid data is collected, the system proceeds to establish the baseline. Otherwise, an error is given and execution is stopped. If the data is valid, the system will scan the sensor line until it detects a reflective spike in data above the noise floor indicative of the launch at step 34. The launch occurs when a significant rise above the noise floor occurs in the scan signal from the scanning unit. Any insignificant spikes may simply indicate noise level and do not show the true beginning or end of the sensor line baseline signal. Once the system has detected launch 52 at step 34, it will measure the baseline at step 36 while searching for another reflective spike and a drop 56 starting from the end of the data at step 38. The drop is the inverse of the launch indicating the end of the sensor line and baseline. The drop returns the signal to the level of noise. At this point, the system will record the end location for the sensor line. At step 42, the baseline is adjusted for reflection. There is a distance immediately following the launch and immediately preceding the drop that is not a measurement of the baseline signal, but rather a reflection. This reflection should not be considered part of the baseline, therefore, it is removed from the baseline at step 42. Once the launch and end have been found and adjusted, the sensor line is searched for non-sensor attenuations between the launch and ends. If found, the non-sensor attenuations will be shown to the user. The user will either accept the displayed attenuations or fix any problems and retake the baseline. At step 44, the final baseline signal 51 is established by the computer system and stored. The baseline signal is to make all comparisons to future real-time scans to determine if a fault attenuation has occurred.

Figure 10C:
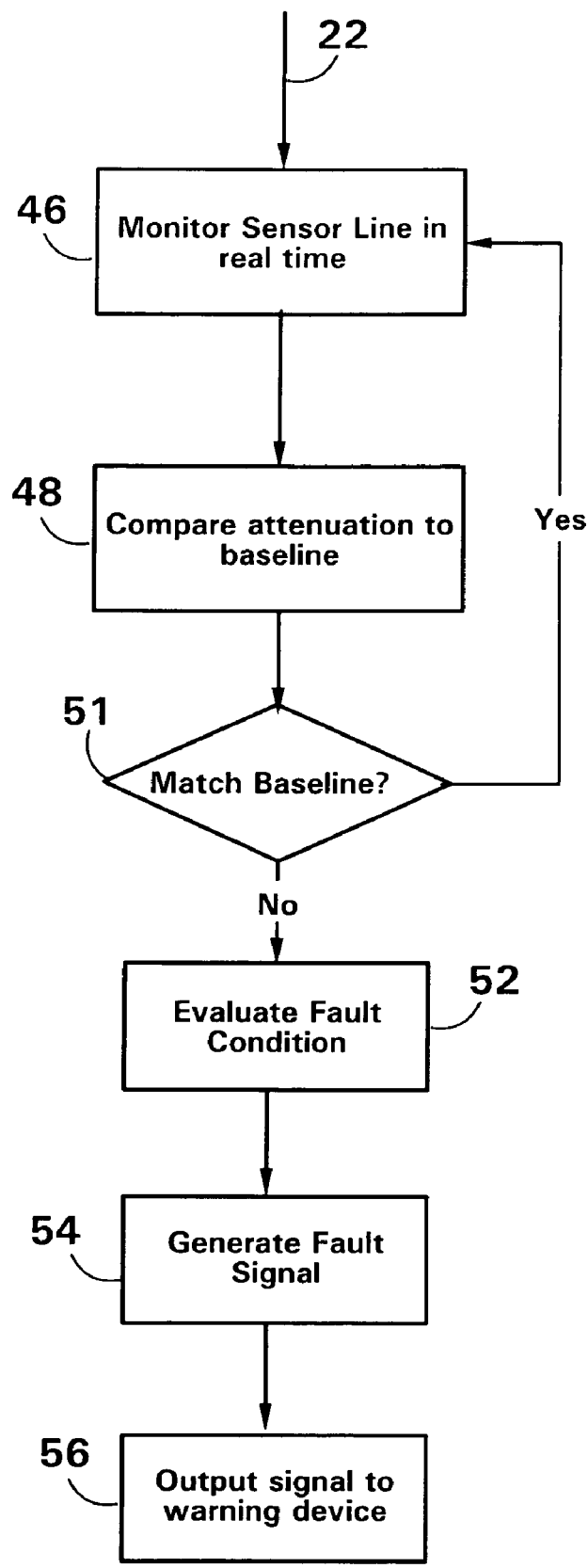
FIG. 10C is a flowchart illustrating monitoring, comparison, and fault signal instructions of FIG. 10A.
Figure 12:
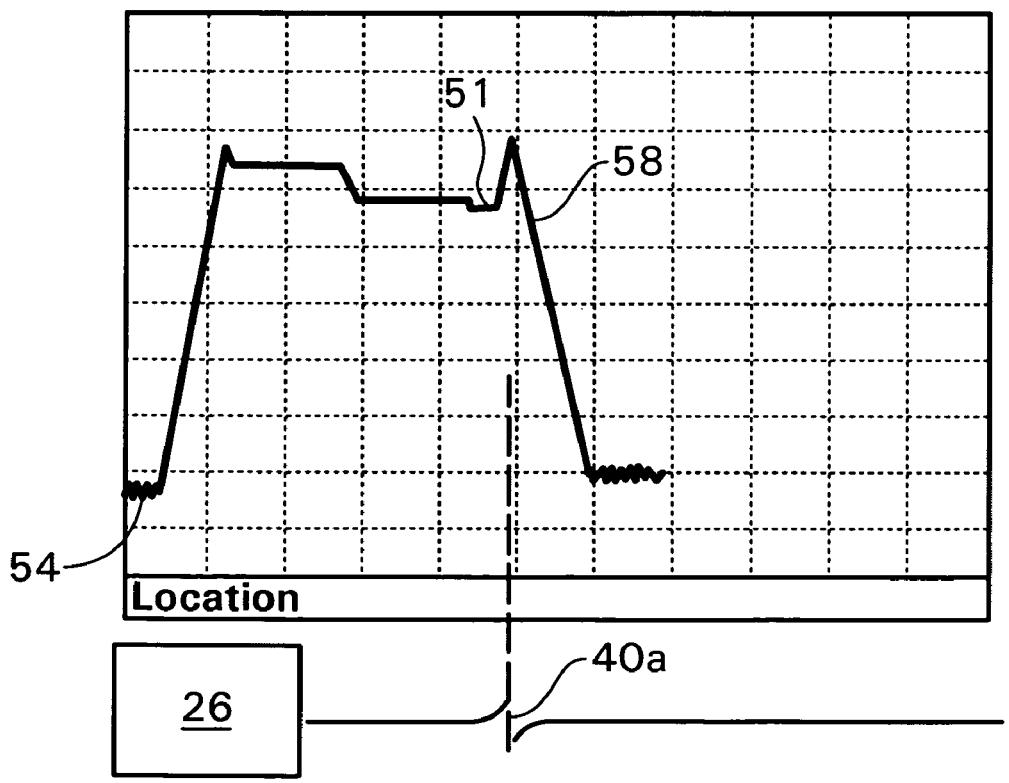
FIG. 12 is an illustration of a scan signal corresponding to a predetermined fault type according to the invention.
Figure 13:
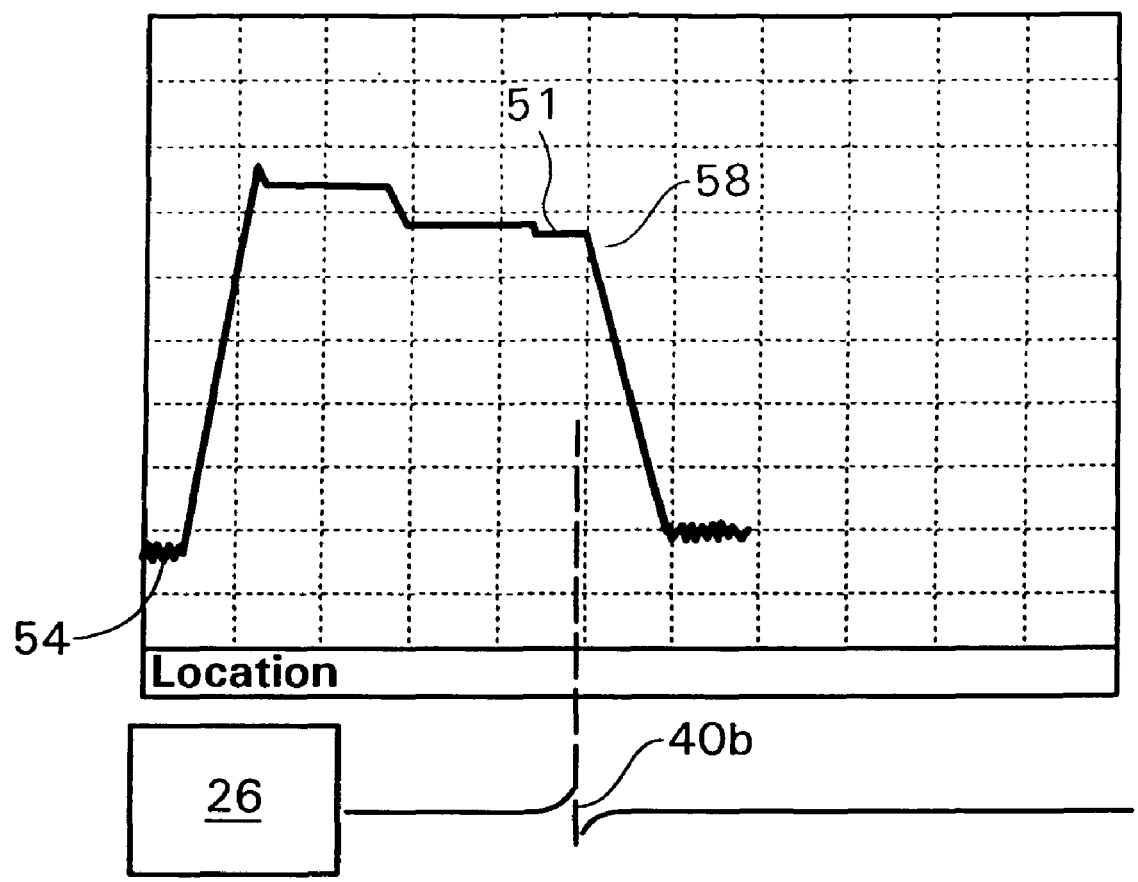
FIG. 13 is an illustration of a scan signal corresponding to a predetermined fault type according to the invention.

FIG. 10C illustrates the monitoring instructions F, comparison instructions G, fault instructions H, and output Instructions 1. After the baseline signal has been acquired, the system performs continuous real-time monitoring at step 46. As described above, the system pulses the fiber optic cable, e.g. every four seconds, to obtain scan signals containing attenuations representing the status of the fiber optic cable. Comparison instructions G then compare attenuations in the scan signals to the baseline signal at step 48. If attenuations match the baseline at step 51, then monitoring instructions F will be processed to continue to monitor scan signals 29 in real-time. If a reflected scan signal does not match the baseline signal at step 51, then fault instructions H are processed. At step 52 the fault condition is evaluated by the system. This evaluation can include a comparison at the attenuation to level data 31 d to determine the type of fault associated with the attenuation by fault level instructions 13. If the attenuation does not match an attenuation in the baseline signal, then the attention is evaluated according to fault type versus attenuation data stored in computer C to determine the specific type of fault condition, e.g., bend, cutting, mass destruction to, or complete break of the cable. For example, FIG. 12 illustrates an attenuation which occurs when the cable is cut through at 40a. Upon evaluating the fault condition, the system generates fault signal 21. At step 56 output Instructions I outputs signal 21 to activate a warning device, thus notifying an attendant of unauthorized activity. As described above, the warning device is one or more of an audible indicator, a visual indicator such as a display or other warning device.

The system and operation is described more fully in U.S. patent application Ser. No. 11/083,038, filed on Mar. 17, 2005, and corresponding PCT Application PCT/US/2005/40079, filed Nov. 4, 2005, herein incorporated by reference.

Thus, it can be seen that an advantageous secure fiber optic data transmission cable can be had according to the invention using fiber optic data transmission line and fiber optic sensor cables. The cable is monitored according to the invention to provide for secure data transmission. An advantageous computerized user interface system and method can be had according to the invention for the fiber optic security system wherein reflected signals from an optic sensor line can be compared to a baseline signal to determine the nature and type of fault condition occurring at any instant corresponding to a prescribed characteristic reflective signal.

While a preferred embodiment of the invention has been described using specific terms, such description is for illustrative purposes only and it is to be understood that changes and variations may be made without departing from the spirit or scope of the following claims.

What is claimed is:

1. A secure data transmission cable assembly for electronically transmitting secure data in a secure manner between remote locations comprising;
   a longitudinal reinforcing member having a degree of stiffness extending generally centrally of said cable;
   a plurality of buffer tubes surrounding said reinforcing member:
   at least one communication fiber carried In each of said buffer tubes for transmitting secure data;
   a plurality of sensor fibers surrounding said buffer tubes for detecting unauthorized activity relative to said communication fibers and preventing access to said communication fibers, said sensor fibers adapted end arranged to receive optical pulse signals which are transmitted along said sensors fibers whereby reflected signals of said pulse signals are reflected back along said sensor fibers;
   said buffer tubes being wound in helices having windings continuously laid. in a first direction for mechanically isolating said communication fibers; and
   said sensor fibers being wound in helices having windings continuously laid about said buffer tube helices, said helices of said sensor fibers being wound in a second direction opposite to the first direction of said buffer tube helices; and,
   an out protective layer surrounding said sensor fibers said outer protective layer Including a plurality of armor protection wires wrapped about said buffer tubes in a spiral;
   whereby said reflected signals may be analyzed to determine the nature and location of any unauthorized activity and an alarm notice communicated to security personnel in order to respond to the activity and protect the secure data.

2. The assembly of claim 1 including filler strands included with Gail buffer tubes surrounding Bald reinforcing member for water resistance.

3. The assembly of claim 1 wherein said outer layer includes a protective jacket surrounding said armor wires, said protective jacket includes a polymeric material, and said armor wires are embedded in said polymeric material.

4. The assembly of claim 1 wherein the number of said buffer lubes includes at least five tubes to maintain a generally round configuration and reduce preferential bending.

5. The assembly of claim 1 wherein said reinforcing member Includes a fiber reinforced plastic rod having a stillness which prevents excessive bending to protect the sensor fibers and serves to prevent excessive cable and fiber contraction in cold weather.

6. the system of claim 1 wherein said sensor fibers include an optical fiber cure with cladding surrounded by a fiber reinforced coating.

7. A secure data transmission cable assembly for electronically transmitting secure data in a secure manner between remote locations comprising:
   a longitudinal reinforcing member having a degree of stiffness extending generally centrally of said cable;
   a plurality of buffer tubes surrounding said reinforcing member,
   at least one communication fiber carried in each of said buffer tubes for transmitting secure data;
   a plurality of sensor fibers surrounding said buffer tubes for detecting unauthorized activity relative to said communication fibers and preventing access to said communication fibers, said sensor fibers adapted and arranged to receive optical pulse signals which are transmitted along said sensors fibers whereby reflected signals of said pulse signals are reflected back along said sensor fibers;
   said buffer tubes being wound in hoboes having windings continuously laid in a first direction for mechanically isolating said communication fibers; and
   said sensor fibers being wound in helices having windings continuously laid about said buffer tube helices, said helices of said sensor fibers being wound in a second direction opposite to the first direction of said buffer tube helices; and an outer protective layer surrounding said sensor fibers;

whereby said reflected signals may be analyzed to determine the nature and location of any unauthorized activity and an alarm notice communicated to security personnel in order to respond to the activity and protect the secure date.

8. The assembly of claim 7 including filler strands included with said buffer tubes Surrounding said reinforcing member for water resistance.

9. The assembly of claim 7 wherein said outer layer includes a plurality of armor wires helically wound about said sensor fibers, and a protective jacket surrounding said armor wires, said protective jacket includes a polymeric material, and said armor wires are embedded in said polymeric material.

10. The assembly of claim 7 wherein the number of said buffer tubes includes at least five tubes to maintain a generally round configuration and reduce preferential bending.

11. The assembly of claim 7 wherein said reinforcing member includes a fiber reinforced plastic rod having a stiffness which prevents excessive bending to protect the sensor fibers and serves to prevent excessive cable and fiber contraction in cold weather.

* * * * *